US006374772B1

(12) United States Patent
Brandt

(10) Patent No.: US 6,374,772 B1
(45) Date of Patent: Apr. 23, 2002

(54) BIRD PERCH HOLDER

(76) Inventor: Thomas Elwood Brandt, 12915 Lyme Bay Dr., Oak Hill, VA (US) 20171

(*) Notice: Subject to any disclaimer, the term of this patent is extended or adjusted under 35 U.S.C. 154(b) by 0 days.

(21) Appl. No.: 09/688,155

(22) Filed: Oct. 16, 2000

Related U.S. Application Data

(60) Provisional application No. 60/161,748, filed on Oct. 27, 1999.

(51) Int. Cl.[7] ................................................ A01K 61/02

(52) U.S. Cl. ...................... 119/57.8; 119/466; 119/467; 119/468; 403/362; 403/373; 403/74.1; 403/74.2

(58) Field of Search ............................... 119/57.8, 466, 119/467, 468; 403/362, 373, 74.1, 74.2

(56) References Cited

U.S. PATENT DOCUMENTS 385,650 A 7/1888 Wemple
3,740,085 A * 6/1973 Evans ........................ 403/362
3,876,318 A * 4/1975 Crispell ...................... 403/290
5,018,480 A 5/1991 Goldman et al.
5,228,411 A * 7/1993 O'Rourke ................... 119/468
5,275,126 A 1/1994 Peterson
5,315,957 A * 5/1994 Garay et al. ................ 119/468
5,487,360 A * 1/1996 Yau ............................ 119/468
5,511,512 A * 4/1996 Pintavalli et al. ........... 119/468
5,588,397 A 12/1996 Johnakin, III
5,713,305 A 2/1998 Hollaway et al.
5,887,542 A 3/1999 Sladowski

FOREIGN PATENT DOCUMENTS

EP 5247 11/1979

* cited by examiner

*Primary Examiner*—Charles T. Jordan
*Assistant Examiner*—Stephen A Holzen
(74) *Attorney, Agent, or Firm*—Roy N. Envall, Jr.

(57) ABSTRACT

For use in bird enclosures or the like, a perch holder that serves to mount a perch on or within the enclosure. The holder consists of a base unit with attached mounting devices to secure the holder to a bird enclosure. The holder has a longitudinal hole therein that accommodates one or more hollow inserts that serve to decrease the diameter of the hole to allow using perches of various diameters.

20 Claims, 3 Drawing Sheets

B 8 6 9 7 24 4 A 20 12 22 10 14 11 2

BIRD PERCH HOLDER

CROSS-REFERENCE TO RELATED APPLICATIONS

This application claims priority from Provisional Application for U.S. Pat. No. 60/161,748, filed Oct. 27, 1999, titled "Twig Perch Fastener".

STATEMENT REGARDING FEDERALLY SPONSORED RESEARCH OR DEVELOPMENT

Not Applicable

BACKGROUND OF THE INVENTION

The invention relates to perches as found in bird enclosures such as bird cages. In particular, the invention is directed to a holder for a perch in which various sizes or diameter perches may be interchangeably used with the holder or fastener. Also, the perch may be changed or replaced in the holder or fastener at will and is made from commonly found materials such as twigs or various diameter dowel rods.

Birds maintained in the house or in other areas are of course of different sizes. Thus, different size perches are needed to accommodate these different sized birds and the respective claws thereof. Moreover, perches of natural materials and of varying diameters are needed that are inexpensive and easy to obtain. Further, perches of more natural shapes and materials are deemed beneficial to the birds and ascetically more appealing for the bird owner. Also, there is a need for perches that are easily and conveniently changed when needed. The perch should be securely held within the bird enclosure or cage.

1. Field of the Invention

The invention relates to holders for perches used in bird cages. The holder is adaptable to securely mount perches of different diameters and lengths as may be desired. The holder also is easy to mount in the cage and perches held thereby are easily changed. The perch may be comprised of commonly found twigs or sticks as well as commercially available dowel rods or the like.

2. Description of the Related Art

Several bird perch patents appear in the patent literature.

Johnakin, III (U.S. Pat. No. 5,588,397) shows a bird perch intended for beak conditioning. The perch is of one size and has materials added thereto for the bird to use in conditioning his beak. The perch is not at all "natural" and the perch is not easily replaced when needed.

Goldman, et al (U.S. Pat. No. 5,018,480) shows a decorative perch or fish tank ornament composed of material shaped to look like a tree branch. The perch is attached to a support device which is attached to the bird cage. The perch is of one size and is attached to the support is driven into the perch.

Sladowski (U.S. Pat. No. 5,887,542) shows a bird food holder consisting of a tree branch and a spiral wire attached thereto to hold the food. The perch holder is permanently attached to a screw and nut arrangement to attach the food holder to the bard cage.

Peterson (U.S. Pat. No. 5,275,126) shows a bird perch consisting of a large tree branch suspended from the top of a large bird enclosure.

Hollaway, et al (U.S. Pat. No. 5,713,305) shows a bird feeding perch that includes a dowel rod upon which the bird is to stand.

Wemple (U.S. Pat. No. 385,650) shows a clamp holder for use in supporting hard materials in a bird cage. The material, cuttle bone, is clamped between two toothed jaws which are spring-tensioned together.

European Patent 5247 A2 shows in FIG. 3 a cage for parrots which has an upstanding perch 100 held within a support 104. The perch is held within the support using a screw 103.

None of the patents listed above provides a perch which can accommodate different diameter perches to accommodate birds of different sizes. Moreover, they do not permit adaptation to using natural materials such as twigs or sticks of various diameters easily found in the yard or a park.

BRIEF SUMMARY OF THE INVENTION

The present invention comprises a holder or fastener for a perch for use in a bird enclosure such as a bird cage common to many homes. The invention consists of a holder or fastener that is attachable to the sides of the bird enclosure and has a hole extending lengthwise into the holder along the centerline thereof. The hole receives the perch for the bird to stand on. The perch is mounted within the hole in the holder whereby the bird owner can easily replace the perch when needed. The invention further includes inserts that may be placed within the hole in the holder to decrease the diameter thereof thus allowing different size or diameter perches for use with one holder. The holder includes a screw-type clamping member for securely maintaining the perch within the holder.

It is contemplated that the inventive holder will be available as a kit for supporting a perch comprising a base part and inserts for installation in a hole in the base part whereby different diameter perches can be mounted within the holder. As will become clear, the holder or fastener of the instant invention permits the bird owner to easily and conveniently provide a perch consisting of materials such as twigs that are more natural for a bird to stand on.

DETAILED DESCRIPTION OF THE INVENTION

Figure 1:
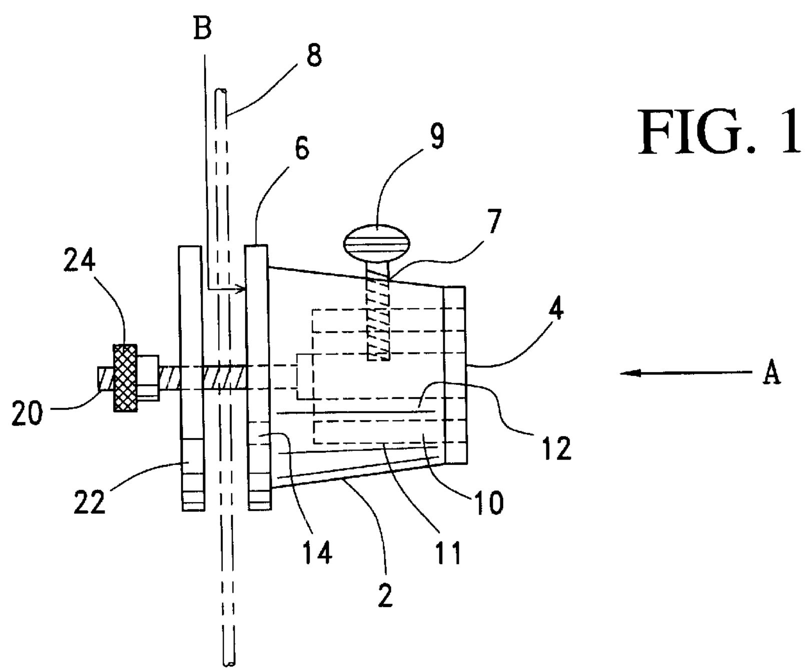
FIG. 1 shows a side view of the perch holder.
Figure 2A:
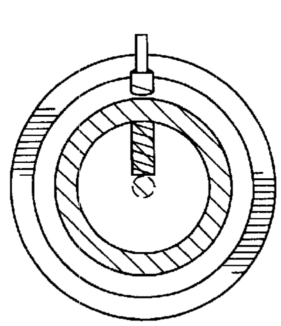
FIGS. 2A through 2C are views looking in the direction of arrow A in FIG. 1 showing the different inserts in place.
Figure 2B:
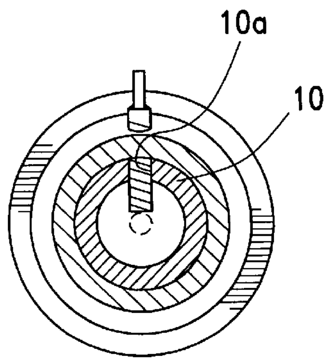
Figure 2C:
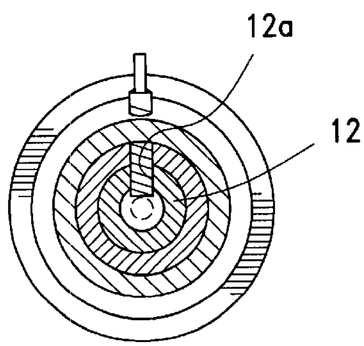

Referring to the drawings, the perch holder or fastener of this invention consists of a main holder body or base 2 having a front face 4 and a back 6. While the main body 2 is shown to be conical it may be of any suitable geometric configuration including cylindrical or rectangular or the like. Extending into main body 2 from front face 4 is hole 11 into which the actual perch (50, 60 or 70, see FIGS. 5, 6 and 7, respectively) is placed and secured for use in the bird cage 8. Screw 9, such as a thumb screw or set screw, extends through threaded hole 7 into contact with the perch thus mounting the perch within main body 2.

Figure 4:
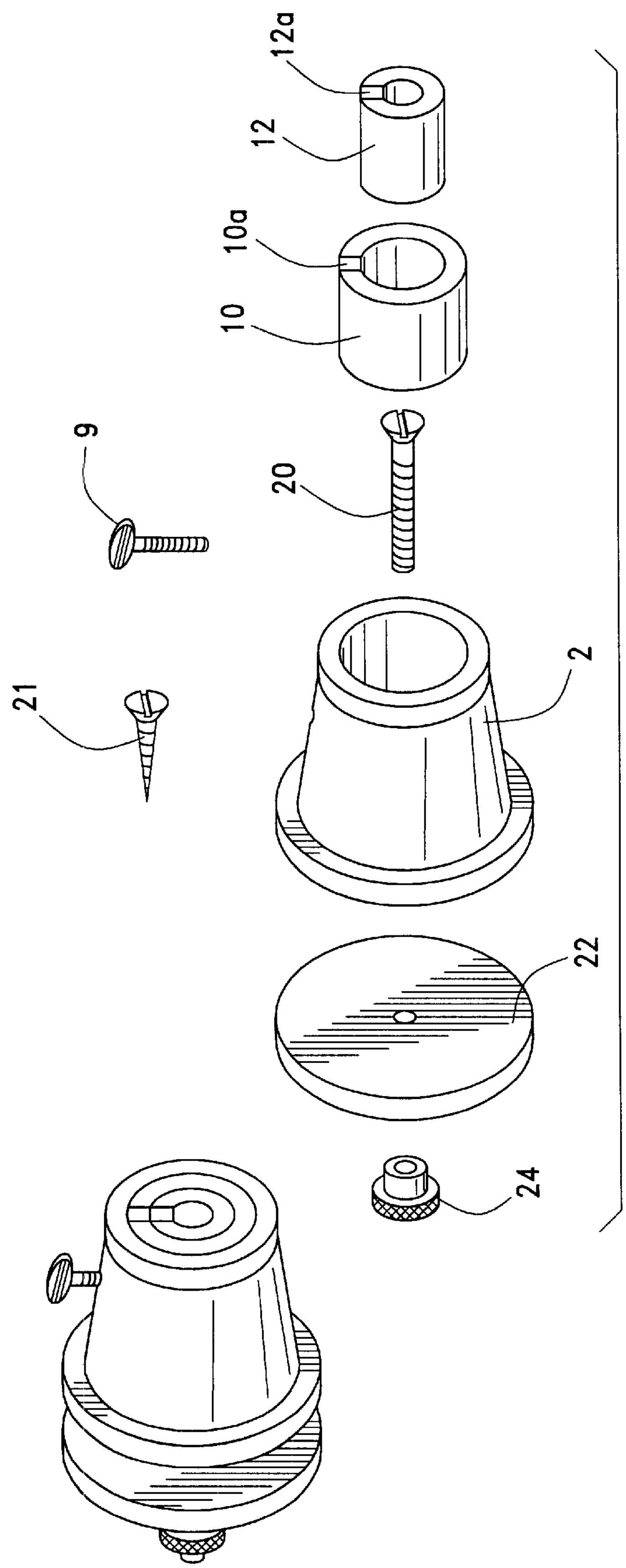
FIG. 4 is an exploded view of the invention.

FIG. 1 further shows two inserts 10 and 12 placed within opening or hole 11 in the main body 2. Inserts 10 and 12 are individual items as seen best in FIG. 4 and are used to decrease the internal diameter of opening 11 in main body 2 to accommodate different size (diameter) perches. In use the inserts are nested in hole 11 and with each other as desired. The inserts are sized in diameter such that one insert has an external diameter to fit firmly within hole 11. The second insert has a diameter to fit snugly within the first insert. The invention is not limited to only two inserts noting that more than two inserts could be provided, if desired. The holder may support different diameter perches by using the holder with or without the inserts.

Alternatively, the inserts may each have the same outer diameter to snugly within hole 11 but respectively different wall thickness. This embodiment would result in using only one insert at a time, each having a different diameter opening to receive different diameter perches.

Inserts 10 and 12 have slits 10*a* and 11*a*, respectively, along the longitudinal lengths thereof. The slits are to permit screw 9 to extend through threaded hole 7 in body 2 and into contact with the perch to securely hold it in place within the holder. While two inserts 10 and 12 are shown in the drawing the invention contemplates using more than two if desired. Also, no insert need be used if the chosen perch has a diameter only slightly smaller than hole 11. One or both (or all) of the inserts are used to the extent necessary to firmly hold the perch of any diameter within opening 11.

Figure 3:
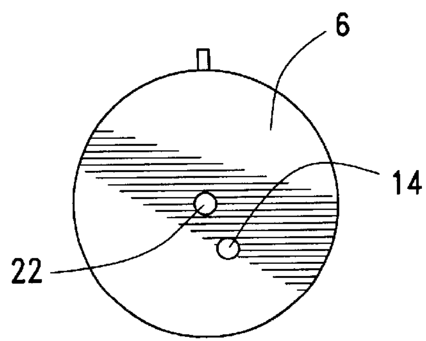
FIG. 3 is a view in the direction arrow B in FIG. 1.

Main body 2, as best seen in FIG. 3, may include an opening or hole 14 extending from the back 6 into hole 11 to permit a tool or stiff wire to be used to push out any inserts that are in the hole when necessary.

The holder body 2 may be attached to the bird cage 8 in any convenient manner such as with bolt 20, attached to body 2, and washer 22 and nut 24 as shown in FIG. 1.

Alternately, if the perch holder is to used for attachment to the exterior of a bird house or the like, bolt 20 may be replaced with a screw 21. Like bolt 20, screw 21 extends from the back of main body 2 affording easy attachment to the exterior wall of a bird house.

FIG. 4A shows the parts of the perch holder prior to assembly. It must be realized that none or one or two of the inserts 10 and 12 would be used at any given time depending on the diameter of the perch FIG. 4B shows the perch holder assembled and using two inserts.

Figure 5:
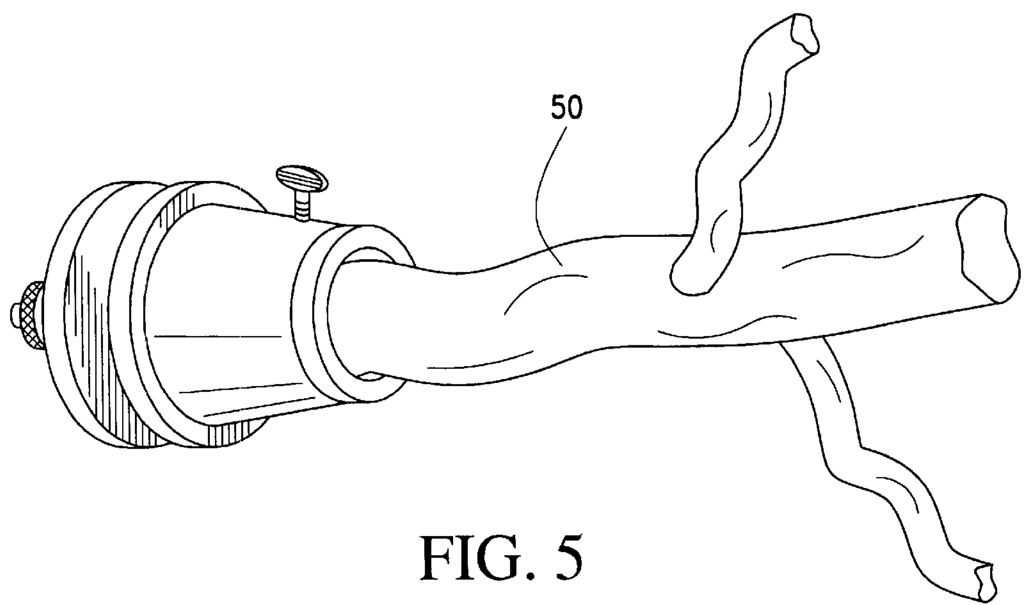
FIGS. 5 through 7 show the holder with various size perches therein.
Figure 6:
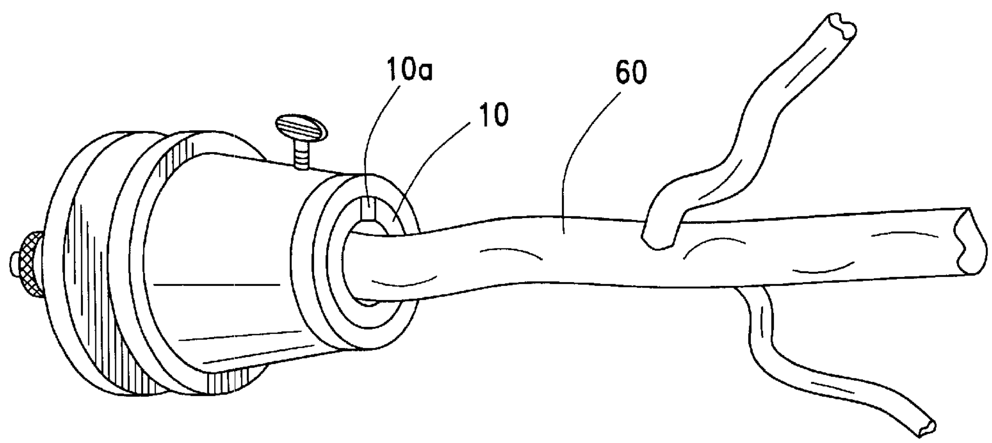
Figure 7:
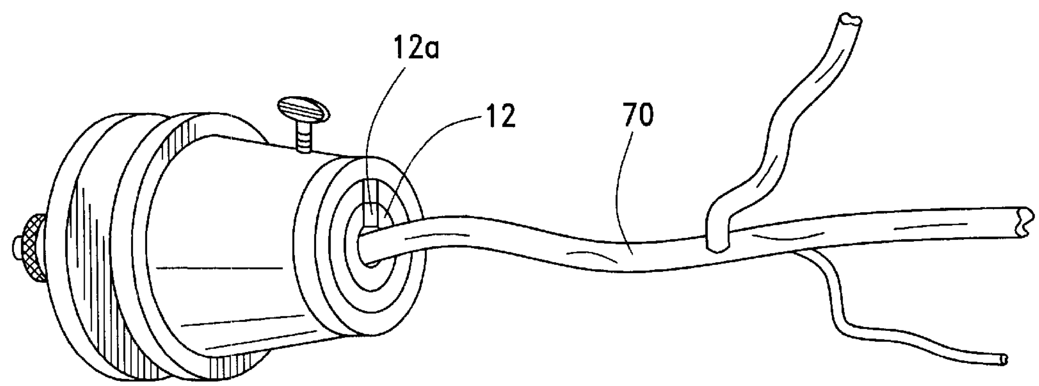

FIGS. 5, 6 and 7 show the holder being used for different size perches. FIG. 5 is the holder without an insert holding a relatively thick perch 50. FIG. 6 is shown having one insert therein for holding a somewhat smaller diameter perch 60 and FIG. 7 shows two inserts for holding an even thinner perch 70.

In use the bird owner selects or finds a perch such as a twig or stick of suitable diameter for the bird within the cage and of a length to fit within the cage. The owner then determines if the perch fits within the hole in the main body without resort to using the inserts. If the perch is smaller in diameter than the hole in the holder then one or more of the inserts are used such that the perch is securely held within the holder opening. Conversely, the owner can take the insert with him while looking for a twig or stick for use as a perch. When a twig to fit the insert opening is found it is then easily installed within the perch holder main body.

It is contemplated that the perch holder or fastener will be supplied as a kit consisting of a main body as described above and one and/or more inserts for use with the main body. Thus the bird owner would use the parts of the kit as needed for the particular bird and bird cage he or she owns.

While the invention has been described for use with random or various sizes of twigs for the perch it is also within the scope of this invention to use various diameter commercially available dowel rods or the like. The bird owner can select a dowel rod suitable for a particular bird and us inserts if necessary to reduce the internal diameter of the holder main body opening for that particular dowel and maintain a tight fit for the dowel rod.

The body and inserts may be constructed of any suitable material such as wood, plastic, fiber glass, metal or the like.

I claim:

1. A bird perch holder, for use with a bird enclosure having a wall, said holder comprising:

a holder body for holding a perch, said holder body comprising a member having a first open end into which said perch is to be inserted; and a second end which is adapted to contact a wall of a bird enclosure, and at least one hollow insert for insertion into the open end of said holder body to decrease the diameter thereof whereby the diameter of said holder opening can be changed to accommodate various diameter perches.

2. The perch holder of claim 1, further comprising said first open end being a hole extending partially into said holder and said at least one insert is hollow and has an outer diameter sized to fit into said hole.

3. The perch holder of claim 1 wherein said at least one insert comprises at least two inserts, said inserts being hollow and of different internal and outer diameters, said outer diameter of said first insert substantially matching the diameter of said hole, said outer diameter of said second insert substantially matching the internal diameter of said first insert, whereby one of said inserts is sized to nest within another of said inserts such that the diameter of said hole may be changed to accommodate different diameter perches.

4. The perch holder of claim 2 wherein said at least one insert comprises at least two hollow inserts and one of said hollow inserts is sized to fit within another of said hollow inserts whereby the diameter of said opening can be changed to accommodate different diameter perches.

5. The perch holder of claim 2, wherein said at least one hollow insert comprises at least two hollow inserts, each of said at least two hollow inserts having the same outer diameter sized to fit within said hole, and the inner diameter of each of said hollow inserts being different from the other whereby a particular hollow insert can be used to hold a different diameter perch.

6. The perch holder of claim 1 wherein a perch is installed in said perch holder and wherein said perch is selected from the group consisting of twigs, sticks or dowel rods.

7. The perch holder of claim 1 further comprising means on the back of the holder body for attaching said holder body to a bird enclosure.

8. The perch holder of claim 1 further comprising means associated with said holder body to secure a perch in said hole.

9. The perch holder of claim 8 wherein said means to secure comprises a screw-type fastener threaded into said body substantially perpendicular to said hole to engage the perch when it is inserted into the hole.

10. The perch holder of claim 9 further comprising an opening in said at least one insert to permit said means to secure to pass through said insert to engage said perch.

11. The perch holder of claim 10 wherein said opening consists of a slit extending longitudinally along each of said at least one insert.

12. The perch holder of claim 1 wherein the body is made from a material selected from wood, metal, plastic and fiber glass.

13. A kit for mounting a perch within a bird cage, said kit comprising:

a body member having a front face and a back, said front face having a hole, at least one insert for insertion into said hole, the insert being hollow to receive a perch therein, and said back having means for attaching said body member within said bird cage.

14. The kit of claim 13 wherein said body member is elongated and said hole extends partially into said body member along its longitudinal length.

15. The kit of claim 13 wherein said at least one insert comprises two inserts, the first of said inserts being hollow and with an outer diameter being sized to engage the inside walls of said hole, and the second of said inserts being hollow and having an outer diameter sized to be placed within and engage an interior wall of said first hollow insert.

16. The kit of claim 13 wherein said at least one insert comprises two inserts, each of said inserts having outer diameters sized to engage the inside walls of said hole and each of said inserts having different internal diameters whereby the inserts can be used to secure different size perches therein.

17. The kit of claim 15 wherein the walls of said inserts have openings therein.

18. The kit of claim 13 wherein said means for attaching comprises a bolt extending from said holder body opposite said hole and a nut and a washer for use with the bolt to engage said enclosure for mounting said holder body thereon.

19. The kit of claim wherein said means for attaching comprises a screw extending from said holder body opposite from said hole.

20. The kit of claim 13 wherein said means for attaching comprises a bolt and a nut and a washer and a screw.

* * * * *